Jan. 11, 1966  W. E. TEN PAS ET AL  3,228,485
ROCK GUARD FOR GRAIN DRILLS
Filed Feb. 21, 1964  2 Sheets-Sheet 1

INVENTORS.
WARREN E. TEN PAS
ROBERT E. LOOMANS
BY
Roger C. Johnson
ATTORNEY

Jan. 11, 1966 W. E. TEN PAS ET AL 3,228,485
ROCK GUARD FOR GRAIN DRILLS
Filed Feb. 21, 1964 2 Sheets-Sheet 2
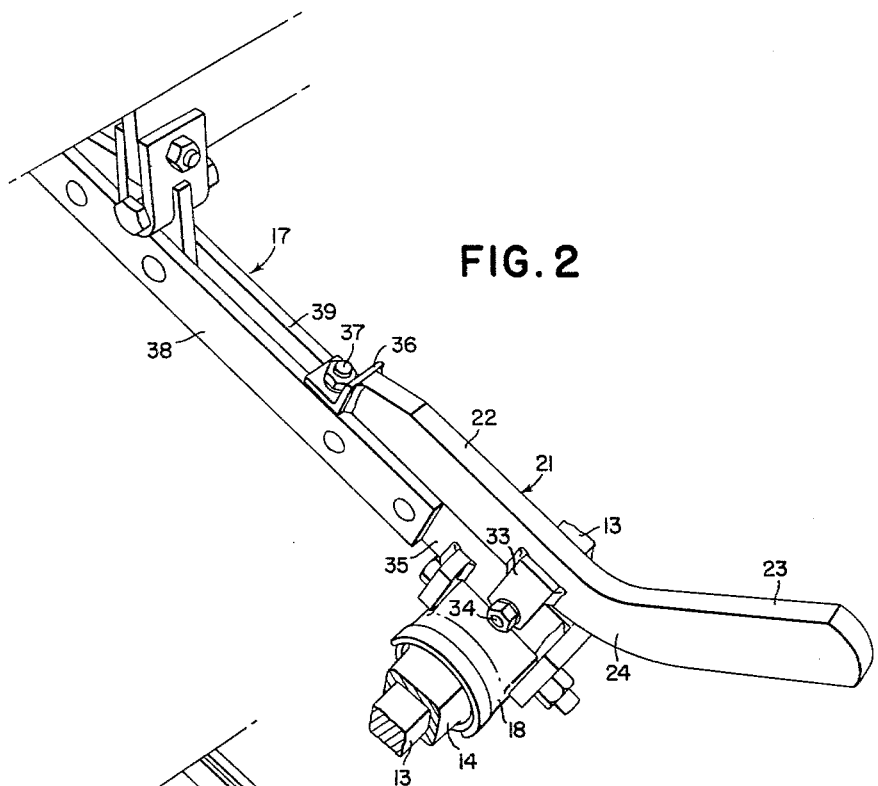
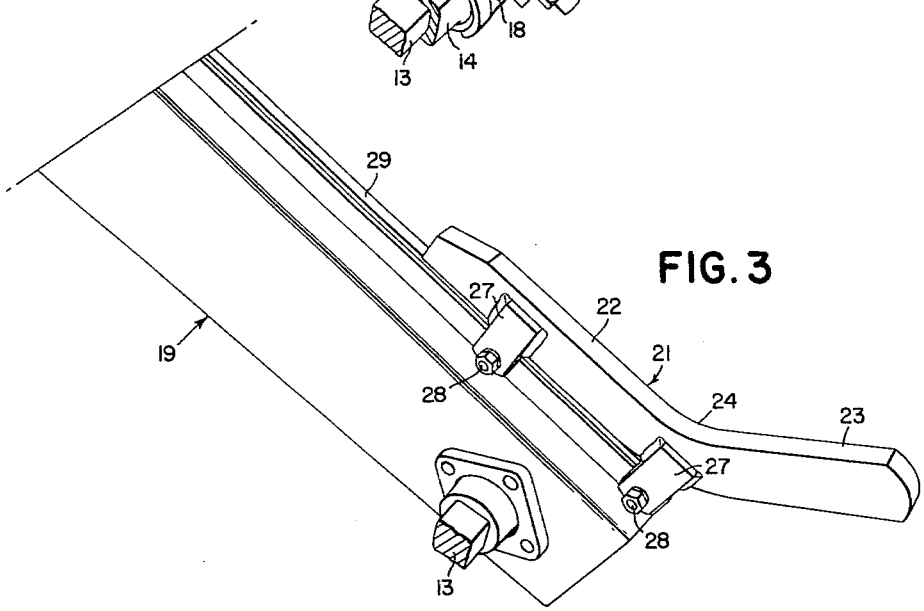
INVENTORS.
WARREN E. TEN PAS
ROBERT E. LOOMANS
BY
Roger C Johnson
ATTORNEY

United States Patent Office 3,228,485
Patented Jan. 11, 1966

3,228,485
ROCK GUARD FOR GRAIN DRILLS
Warren E. Ten Pas and Robert E. Loomans, Horicon, Wis., assignors to Deere & Company, Moline, Ill., a corporation of Delaware
Filed Feb. 21, 1964, Ser. No. 346,428
1 Claim. (Cl. 172—538)

This invention relates generally to agricultural implements and more particularly to grain drills.

The object and general nature of this invention is the provision of a rock guard so constructed and arranged as to be disposed between the press wheels of a lister drill. When using drills of this type, especially those equipped with solid press wheels, it sometimes happens that stones may be wedged in between the sides of two adjacent press wheels and carried by the rotation of the latter around into contact with the drawbars or the chain guides associated with the press wheels, with consequent possibility of damage to these parts. It is, therefore, the principal object of this invention to provide a rock guard conveniently carried by the drawbars and chain guards or housings, the rock guard being so shaped that it serves to work any stones wedged in between adjacent press wheels, generally rearwardly and outwardly from between the wheels, leaving the stones behind.

More specifically, each rock guard includes a bar having one portion adapted to be connected to the associated drawbar or chain housing and the other portion of the bar curved rearwardly outwardly in the direction of rotation of the press wheel so that any stone caught between the two press wheels may be readily dislodged by the bar. It will be understood that in grain drills of the press wheel type, the press wheels are arranged in one or more gangs and mounted on an axle rotatably connected with the grain drill frame. The axle is connected with the grain drill frame by drawbars, the axle and press wheel gang being utilized as means for driving the dispensing mechanism of the grain drill. Constructed according to the principles of this invention, the rock guard is a simple inexpensive means for effectively dislodging the stones.

These and other objects and advantages of this invention will be apparent to those skilled in the art after a consideration of the following detailed description, taken in conjunction with the accompanying drawings, in which:

FIG. 2 is a fragmentary perspective view of a rock guard fixed to one of the drawbars shown in FIG. 1.

FIG. 3 is a fragmentary perspective view of a rock guard fixed to the chain drive shield shown in FIG. 1.

Figure 1:
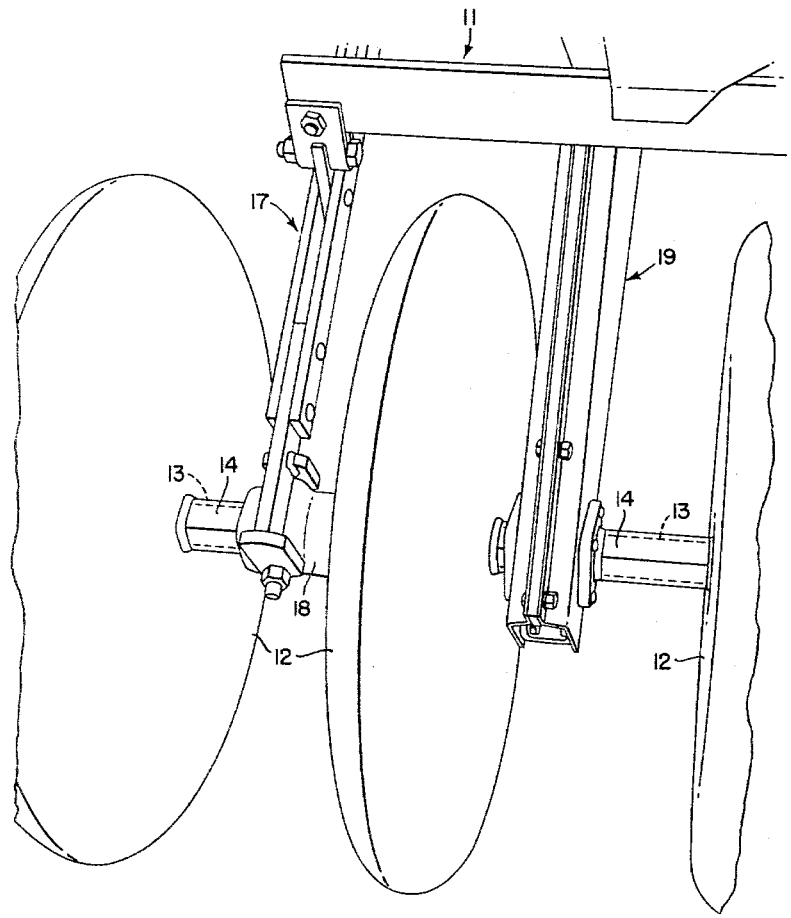
FIG. 1 is a fragmentary perspective view of a portion of the press wheel gang of a press wheel drill adapted to receive the rock guards of the present invention.

Referring first to FIG. 1, the grain drill in which the principles of this invention have been incorporated includes among other things a frame 11 carried at the rear on a plurality of press wheels 12 mounted nonrotatably on a transverse press wheel shaft 13. Each shaft receives a gang or plurality of press wheels, and the wheels are maintained in the desired spacing along the shaft 13 by suitable spacers 14. Preferably the shaft 13 is square in cross section and the spacers 14 are of similar configuration. The grain drill may be equipped with one or more of such press wheel gangs.

Each press wheel gang is connected with the frame by a pair of drawbars 17 that at the forward ends are pivotally connected with the grain drill frame in about the same manner as suggested in the patent to Hyland 2,323,044, issued June 29, 1943, or in the patent to Hyland et al. 2,563,172, issued August 7, 1951. The rear end of each drawbar carries suitable bearing means 18 by which the associated press wheel shaft is journaled for rotation. Also extending between each press wheel shaft and the seed dispensing mechanism of the grain drill is a drive arrangement including sprocket and chain means enclosed within a drive housing 19. As will be seen from FIGS. 2 and 3, the above-mentioned drawbars and drive housing extend between adjacent press wheels and occupy an appreciable proportion of the space between the wheels. It sometimes happens, as when operating in stony fields, that a stone will become wedged in between adjacent press wheels and will be carried around by the latter until it strikes one of the drawbars or drive housings, inflicting damage thereto. The principal object of this invention is to provide a rock guard to dislodge stones and the like wedged in between the press wheels and prevent them from doing any damage to the drawbars or drive housings. The rock guards of this invention will now be described.

Figure 4:
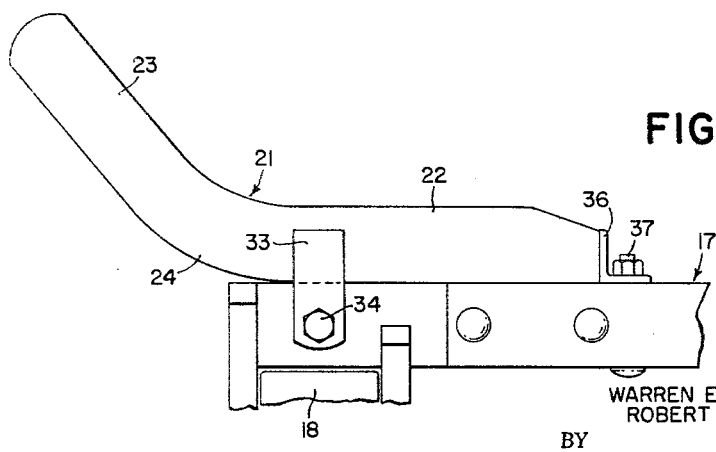
FIG. 4 is a side view of one of the rock guards constructed and arranged for mounting on a press wheel gang drawbar.

Referring now to FIGS. 2, 3, and 4, each of the rock guards of this invention comprises a generally fore-and-aft extending bar 21 that includes a first portion 22 that is straight and a second portion 23 that is disposed angularly with respect to the first portion 22, the two portions being connected together by a curved section 24. Each bar 21 is provided with apertured lug means that permits bolting the bar to the associated support. The rock guards that are adapted to be attached to the drive housing 19 are provided with two sets of apertured lugs 27, these lugs being apertured to receive bolts 28 that extend through openings in the associated bar 29 that forms a part of the housing 19.

The rock guards that are adapted to be attached to the drawbar 17 are provided with one set of apertured lugs 33 which receive a bolt 34 extending through one of the bar sections 35 of the drawbar 17. The forward end of the rock guard bar 22 (FIG. 2) is provided with an angle clip 36 that receives bolt means 37 that extends upwardly between the two bar sections 38 and 39 forming a part of the drawbar 17.

In both forms of the rock guard, it is to be observed that the curved section 24 of each extends rearwardly and upwardly away from the rear end of the associated support, that is, the drawbar 17 and the drive housing 19. Thus, any stone that is wedged in between two adjacent press wheels 12 and brought around by the rotation of the press wheels will engage the rear angled portion 23 of the associated rock guard and will be forced by the latter outwardly and dislodged from between the press wheels, whereby the stones will not be carried around by the rotation of the press wheels and caused to inflict damage to the drawbars or the drive housings.

While we have shown and described above the preferred structure in which the principles of this invention have been incorporated, it is to be understood that our invention is not to be limited to the particular details, shown and described above, but, that, in fact, widely different means may be employed in the broader aspects of our invention.

What we claim, therefore, and desire to secure by Letters Patent is:

In a grain drill or the like, the combination of a frame, a gang of press wheels disposed in axially aligned relation, an axle on which said wheels are disposed in relatively closely spaced relation, a rigid straight member disposed in a plane generally parallel to and between two adjacent press wheels, one end of said member being connected with said axle and the other end of said member being secured to said frame, the combination therewith of a rock guard, said rock guard comprising a generally fore-and-aft extending bar of rectangular cross section having relatively wide sides and relatively narrow edges, said bar having a first straight portion, a second portion disposed angularly with respect to the first portion, and a curved third portion interconnecting the first and second portions, the second portion extending generally radially outwardly and circumferentially in the direction of press wheel movement, apertured lug means secured to the sides of said first portion and extending generally downwardly therefrom, fastener means passing through said apertures and securing said rock guard to said straight interconnecting member, the sides of said rock guard bar being generally parallel to said press wheels, the parts being so arranged and constructed that during operation of the grain drill rock or the like wedged between the press wheels will contact one edge of said rock guard bar and be prevented thereby from contacting said straight interconnecting member.

References Cited by the Examiner
UNITED STATES PATENTS

| | | | |
|---|---|---|---|
| 1,932,054 | 10/1933 | Von Brethorst | 280—158 A |
| 3,005,426 | 10/1961 | Sorensen et al. | 111—85 X |
| 3,033,135 | 5/1962 | Gouin | 111—52 |

ABRAHAM G. STONE, *Primary Examiner.*

WILLIAM A. SMITH III, *Examiner.*